Feb. 8, 1927. 1,616,665
J. H. MURCH
CAN
Filed Aug. 15, 1921
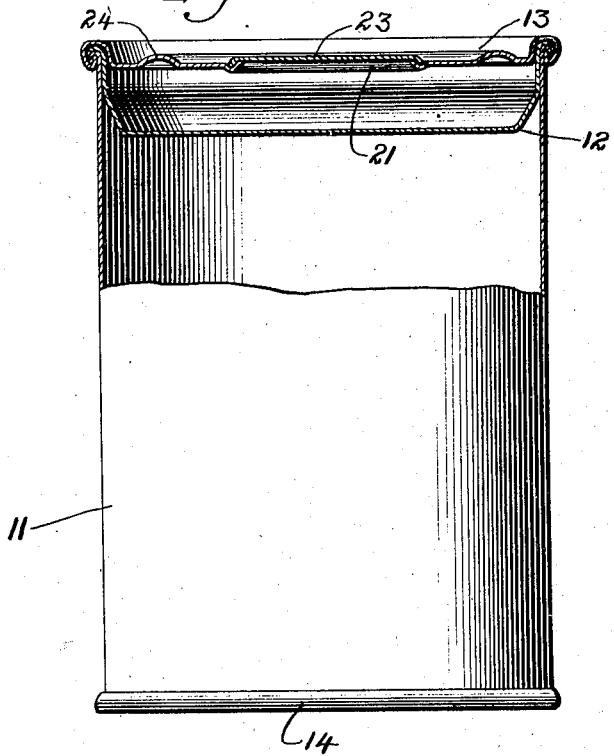
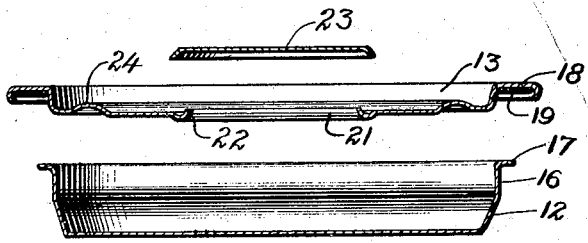
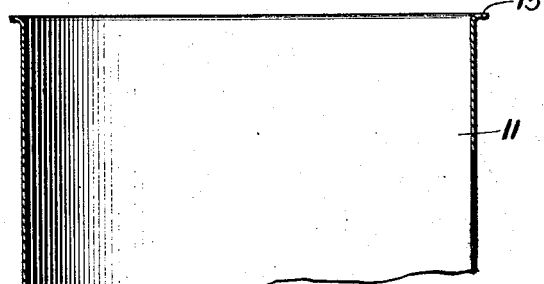
Inventor:
John H. Murch
By: Munday, Clarke & Carpenter
Attys.

Patented Feb. 8, 1927.

1,616,665

UNITED STATES PATENT OFFICE.

JOHN H. MURCH, OF PORTLAND, OREGON, ASSIGNOR TO AMERICAN CAN COMPANY, OF NEW YORK, N. Y., A CORPORATION OF NEW JERSEY.

CAN.

Application filed August 15, 1921. Serial No. 492,230.

My invention relates to containers and particularly to that type adapted for the packaging of contents of different character and requiring different processing.

A principal object of the invention is the provision of a compartment container wherein one compartment may be completely filled and sealed and the contents processed prior to the filling of the other compartment, and wherein the member forming the receptacle for one compartment serves as a closure for the other.

A further object of the invention is the provision of a container of this character in which the member forming the compartment adapted to be subsequently filled is provided with a flange arranged in registration with a flange of the container body and adapted to be seamed with the cover flange upon said body flange in a single operation.

A still further object of the invention is the provision in a container of this type of compartments particularly suited to the packaging of such contents as macaroni and cheese in the relative quantities required.

Numerous other objects and advantages of the invention will be apparent as it is better understood from the following description, which, taken in connection with the accompanying drawings, discloses a preferred embodiment thereof.

Referring to the drawings,

Figure 1 is an elevational view of a container embodying my invention, the upper portion thereof being shown in section; and Fig. 2 is a fragmentary vertical section through the container, the different parts thereof being shown in separated relation.

It will be noted that the container shown by way of illustration in the drawings comprises primarily a body portion 11, a combined compartment-forming member and closure 12 and a top cover 13. The body may be of any preferred type and has a bottom end seamed or otherwise secured thereon, as at 14. The upper portion of the container body is desirably provided with a horizontal flange 15 such as is ordinarily interfolded or seamed with a cover or end flange to close the container. The compartment member 12 may be of any desired depth, and in the present instance, is arranged in the form of a pan having a straight wall portion 16 adapted to fit snugly within the body wall. This pan is provided with an upper horizontal flange 17 which registers with the flange 15 upon the body wall. The cover 13 has a channel flange 18 in which is fitted a gasket 19. After filling the large compartment formed by the main body of the can the compartment pan 12 is inserted in the top part of the container and the cover 13 positioned thereon. By the usual seaming operation the three flanges 15, 17 and 18 are interfolded, thereby locking the pan and cover upon the container body. Thereafter the can may be processed since the compartment member 12 serves as a hermetic closure.

It will be noted that the cover 13 is provided with an aperture or stud hole 21 in its center portion, about which is provided a flange 22. After insertion of the contents of the compartment pan 12, a cap 23 is positioned over the aperture 21 and secured as by soldering to the flange 22. A corrugation or bead 24 is provided in the cover exteriorly of the cap 23 for the purpose of protecting said cap from removal and for strengthening the material and providing a comparatively even top surface.

It will be understood that when my container is used for macaroni and cheese the arrangement of the parts as just described permits the necessary cooking or processing of the macaroni prior to the filling of the small compartment with the cheese and that the cheese may be readily inserted through the aperture 21 since when supplied in this manner it is normally grated or powdered.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container comprising a body portion forming a main compartment and having an outward flange, a compartment forming member insertable into an end of said body portion and forming a closure therefor and having a flange extending out over the flange of the body, and a cover having a flange adapted to be seamed upon and under the registering flanges of said body and compartment members and having a depressed part engaging against the inside of the wall of the compartment forming member, and having a filling opening and a cap therefor adapted to permit subsequent filling of said compartment member.

2. A container comprising a flanged main body receptacle, a relatively smaller flanged receptacle adapted to be inserted in an end thereof, and a cover having a flange embracing the flanges of said receptacles whereby to hermetically close said main receptacle, and having an opening through which said smaller receptacle may be subsequently filled, and a closure for said opening.

JOHN H. MURCH.